TUNING SELECTOR ASSEMBLY HAVING PRE-ADJUSTED POTENTIOMETERS

Filed July 5, 1968 2 Sheets-Sheet 1

Inventor:
PETER-JOSEF GRAF by Stephen H. Frishauf Atty

Oct. 20, 1970 PETER-JOSEF GRAF 3,535,671

TUNING SELECTOR ASSEMBLY HAVING PRE-ADJUSTED POTENTIOMETERS

Filed July 5, 1968 2 Sheets-Sheet 2

United States Patent Office 3,535,671

Patented Oct. 20, 1970

3,535,671

TUNING SELECTOR ASSEMBLY HAVING PRE-ADJUSTED POTENTIOMETERS

Peter-Josef Graf, Hildesheim, Germany, assignor to Blaupunkt-Werke G.m.b.H., Hildesheim, Germany, a limited-liability company of Germany Filed July 5, 1968, Ser. No. 742,626
Claims priority, application Germany, July 21, 1967, B 93,591
Int. Cl. H01c 5/02, 5/08
U.S. Cl. 338—183 13 Claims

ABSTRACT OF THE DISCLOSURE

To adjust the tuning of a tuned circuit having variable capacity diodes, the bias of the diodes is adjusted by selectively pre-settable potentiometers, arranged as resistance elements on a substrate, over which a slider is longitudinally slidable; the face of the slider away from the resistance elements is formed with rack teeth, which engage in a spiral thread formed on a rotatable disc to adjust the slider on the resistance element. When formed as a pushbutton switch, the slider adjustment shaft may carry a pushbutton switch; when formed as a rotary tuner switch, for example for television application, the resistance elements may be arranged star-shaped on a substrate with a common disc, deformable to selectively engage the slider on a selected resistance element.

The present invention relates to a tuning selector to adjust the tuning of a receiver to preselected frequencies, and more particularly to a preset tuning selector for use with variable capacity diodes.

Tank circuits can be tuned by varying the capacity of the circuit, using variable capacity diodes, the capacity of the diode depending upon the bias applied thereto. The bias can easily be varied by tapping a potentiometer from a fixed source of voltage. The amount of resistance of the potentiometers can be determined roughly by design; however, fine tuning should be available for each station. Various arrangements using potentiometer-type channel selectors have been proposed which, however, have not found great acceptance due to the substantial expense of their manufacture.

It is an object of the present invention to provide a tuning selector, and more particularly a multi-channel tuning selector switch either of the pushbutton, or rotary type, which is inexpensive to manufacture, simple in construction, and reliable in operation.

SUBJECT MATTER OF THE PRESENT INVENTION

Briefly, in accordance with the present invention, resistance elements are formed on a substrate, and each of them have a slider associated therewith facing the resistance element, which, when connected across a source of potential, provides a bias for the variable capacity diodes. The side of the slider opposite that facing the resistance elements is formed with rack teeth, which are engaged by a spiral thread, or track, formed on the face of a rotatable disc. By turning the disc, the slider will move lengthwise of the resistance element, when suitably constrained in a path thereacross.

When the selector is in the form of a pushbutton switch, the slider is preferably formed with an elongated opening, through which the shaft holding the disc extends. The extent of travel of the slider is thus limited by the length of the hole. Each one of the channels will have a resistance element associated therewith, the shaft being axially movable and itself operating a switch which connects the appropriate resistance element slider in circuit upon being pressed.

In another embodiment of the present invention, a single large disc is used covering the plurality of resistance elements, arranged in star-shaped fashion on a substrate. The disc is made of flexible material and, upon selection of a particular channel, and thus a particular resistance element and slider, an operating member presses that portion of the disc opposite the slider against the rack-teeth surface so that, upon turning of the disc, the particular slider will change position thus effecting fine tuning.

The coupling connection, and the transverse motion transmission between disc and slider is thus simple and can be effected by readily available and inexpensively made parts.

The structure, organization, and operation of the invention will now be described more specifically with reference to the accompanying drawings, wherein.

Figures 1, 2:
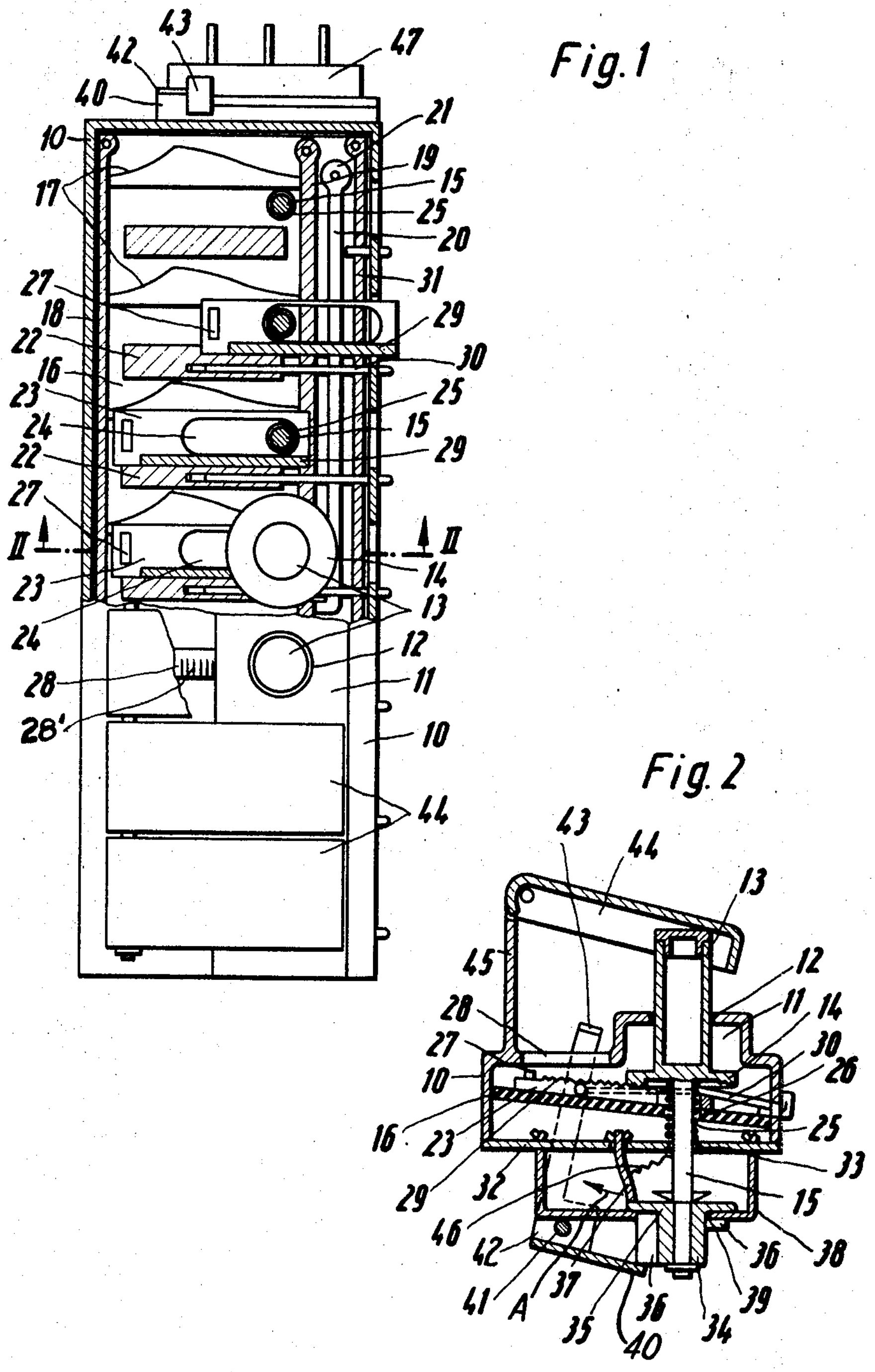
FIG. 1 is a front view of a pushbutton selector assembly, partly in section.
FIG. 2 is a sectional view along line II—II of FIG. 1.

Referring first to the embodiment illustrated in FIGS. 1 and 2: A flat, elongated housing 10 is formed with a projecting extension 11, having a plurality of bores 12 therein, for example seven. Each one of the bores 12 receives a connecting shaft 13, having a projecting end which is formed as a pushbutton. The inward end of connection shaft 13, that is the one within the housing 10, is formed as a disc 14, and connected to a bolt 15. The disc, or flange 14 has its lower face formed with a spiral thread. An insulating plate 16 is inserted in housing 10 at an inclined angle with respect to the shaft 13 and bolt 15. The upper side (FIG. 2) of the inclined insulating plate 16 has resistance elements 17 applied thereto. The resistance elements 17 are connected across a pair of buses 18, 19. Bus 19 connects over a resistance line 20 to a connection point 21. Bus 18 serves as a common, non-adjustable resistance for all the resistance tracks 17.

A conductor 22, which may be a conductive track, is arranged parallel to all the resistance elements 17, on the upper side of insulating plate 16. An elongated, substantially rectangular body of insulating material 23, having a sliding contact (not shown and well known and standard in the art) is provided for each of the resistance elements 17, to slide longitudinally thereover. Each of the sliders 23 also connects with an adjacent portion of conductive track 22. Sliders 23 are formed with an elongated opening 24, through which bolts 15 connected to shaft 13 pass. A spring 25 surrounds bolt 15 and likewise passes through the elongated opening 24. Bolt 15 of shaft 13, as well as springs 25 additionally pass, each, through a bore 26 formed in suitable locations on the insulating plate 16. All of the sliders 23 are provided with an indicator 27, which passes beneath a window 28 in the housing 10. Scales 28', and only schematically indicated, may give a reference position for the sliders, corresponding to various communication channels. Each slider 23 is formed at the side opposite that contacting the resistance elements with a toothed rack surface 29, arranged on the longitudinal web remaining on bodies 23 adjacent the elongated opening 24. The rack teeth extend preferably over the entire length of the bodies 23. The teeth are preferably formed triangularly in cross section, as best seen in FIG. 2, and are likewise inclined with respect to the longitudinal direction of motion of sliders 23, so that upon pressing one of the shafts 13, formed as pushbuttons, and engagement of disc 14, the thread on disc 14 will match with the notches between the rack teeth.

A switching means, formed as a contact spring 30 is associated with each of the pushbuttons formed by shaft 13. All contact springs 30 are connected to a common bus 31. Upon pressing any one of the pushbutton shafts 13, spring 30 is pressed by disc 14 against the appropriate conductor 22 formed next to the resistance element on the insulating plate 16.

Extensions 15 of the pushbutton shafts 13 extend not only through bores 26 within the insulating plate 16, but continue further through bores 33 in the bottom plate 32 of the housing of the entire assembly. A sleeve 34 is secured to the extensions 15, to be rotated with the extensions, but not with respect thereto. Each sleeve 34 is provided with a disc cam 35 and a plurality of switching cams 36. Two of the switching cams 36 are seen in FIG. 2 and, as illustrated, the switching cams have different axial lengths. A catchplate 37, spring-held by a spring 46 towards the extension 15, is swingably mounted in the housing so that when a pushbutton shaft 13 is depressed, as seen in FIG. 2, catch 37 will engage behind cam 35 and lock the selected button in position. The catchplate 37, not shown in FIG. 1, is elongated and extends lengthwise of the housing beneath all the individual switching units.

The bottom plate 32 of the housing has an extension 38 secured thereto, having as many openings 39 formed therein, as the number of pushbuttons present (seven, in the present example). Sleeves 34 with switching cams 36 extend through the openings 39. Housing 38 carries a shaft 41, at one end thereof, to which a swingable lever bar 40 is mounted. Depending upon the length of cam 36, the swingable lever bar 40 will swing about pivot 41, more or less, which motion is transmitted over a lever extension 42 to the slider of the band switch 47, as well as to an indicator 43. Both lever extension 42 and band switch 47 are only schematically indicated since they form no part of the present invention and are elements well known in the art. Swingable keys 44 cover the projecting ends of the connection shafts 13. The keys are secured to a rail 45, secured to housing 10. They may be swung upwardly, away from the position shown in FIG. 2, in order to expose the projecting ends of the pushbutton connecting shafts 13.

Operation: Depression of a key 44 into the position shown in FIG. 2, transfers the motion to the operating shaft 13, which will move downwardly (FIG. 2) until the thread on the face of disc 14 will engage the rack teeth on slider 23. Holding cam 35 on sleeve 34 first slides along catch 37, deflecting the catch against the force of the spring 46. As soon as the final, pressed-down position is reached, catch 37 will hold shaft 13, and extension 15, in position. Since the catch 37 is elongated, and extends beneath all the individual switching units depression of any key 44, and thus of any shaft 13, will cause engagement of cam 35 at the side of catch plate 37, swinging of catch plate 37 in the direction of arrow A, and release of any previously depressed shaft, before a second switching unit fully engages.

Upon pressing the selected key, flange or disc 14 carries the associated contact spring 30 along, pressing the same against the associated conductor 22, causing the resistance element associated with the selected key to be switched in circuit for connection to the remainder of the tank circuit. Downward motion of shaft 13, and with it bolt 15, causes engagement of a cam 36 with the tilt bar 40, causing connection of the band corresponding to the selected key. If it is desired to fine-tune a given channel, then key 44 is lifted and the position of slider 23 on the resistance element is changed by turning connection shaft 13. The movement of the slider between terminal positions is limited by the length of the elongated hole 24. The threads on disc 14 engage only on one side of the connection shaft 13, due to the inclination of the insulating plate 16. Any position of slider 23, as determined by rotation of shaft 13, will remain stored even after the particular key is released. The slider itself is guided on the resistance element by means well known in the art and not shown in the drawings for simplification. It is held in position, for example, by friction, by suitably dimensioning a contact spring on the slider bearing against a resistance element 17, and associated contacts track 22, while being constrained against the force of the spring by a small flange extending towards the other side of insulating plate 16, adjacent each of the resistance element 17 and track 22 combinations. Other arrangements, as well known in the linear potentiometer art, may of course be used, the simplest one being a friction holding arrangement.

The band associated with any one of the keys, and thus operating shafts, can readily be changed by flipping keys 44 outwardly (FIG. 2), and then pulling on shaft 13, while rotating the shaft to bring a differently sized cam 36 in position to cooperate with the band change bar 40, so that the band change bar 40 will swing for a distance determined by the length of the newly selected cam 36. During this change of band, the thread on disc 14 will be out of engagement with the rack teeth on slider 23.

It may occur that, upon operating one of the keys 44, the thread on disc 14 does not exactly match into a notch between the rack teeth of rack 29 and, in the worst case, a projection on the thread on disc 14 will be exactly opposite a tooth of rack 29. This causes bending of disc 14 by, at the worst, the depth of the teeth of rack 29. It is therefore preferred to make the operating shaft 13, and disc 14 from a single molding of synthetic plastic, so that deformation of disc 14 does not cause a permanent bend. A small amount of twist, only, of the shaft 13 will cause proper engagement of thread and rack.

Various modifications of the pushbutton assembly can be made; for example, slider 23 need not be formed with an elongated hole, but may merely pass by the operating shaft 13 on one side; racks can be formed on both webs of the slider. There are other modifications which readily suggest themselves.

Figure 3:
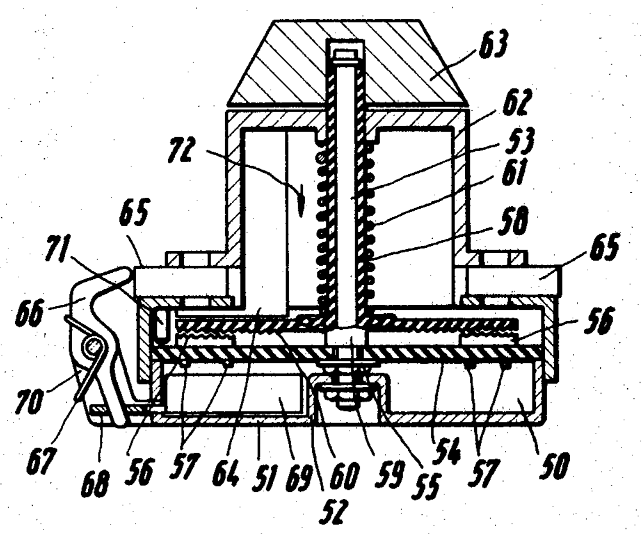
FIG. 3 is a cross-sectional view through a rotary tuning selector switch.

FIG. 3 illustrates a different embodiment of the present invention, in which a single disc covers a plurality of sliders and resistance elements. The circular housing 50 has its bottom plate formed with a central hub 52, in which a shaft 53 is secured. A circular insulating plate 54 is secured in housing 50, having a central bore 55, through which shaft 53 extends. Insulating plate 54 has resistance tracks formed thereon, extending radially in star-shaped fashion, and not separately illustrated in FIG. 3. Each resistance track has a slider 56 associated therewith, conducted in a predetermined path over the resistance tracks by guide lugs 57 extending through slots formed in disc 54. The side opposite the sliders 56 is again formed with rack teeth. The hollow connection shaft 58 extends about shaft 53. Connection shaft 58 had disc 60 secured thereto at its lower end, which again is formed at its under-surface with a thread arranged to engage the rack teeth on the sliders 56. Connecting shaft 58 has a compression spring 61, an operating knob 62, and a fine tuning knob 63 secured thereto. Fine tuning knob 63 is connected to the shaft, in conventional manner, not shown in the drawings. Operating knob 62 is provided with a radially extending operating bar 64. Disc 60 is formed of synthetic plastic of sufficient resiliency to enable deformation of the disc so that, upon pressing downwardly (in the direction of FIG. 3) on operating knob 62, operating bar 64 will press disc 60 against a slider 56 only where the operating bar 64 is located, so that only a single slider will be engaged by the disc.

A switching cam 65 is associated with each of the resistances, and arranged on operating knob 62. Switching cams 65 are made to have a number, for example three, positions extending different horizontal distances. Rotation of operating knob 62 carries the cams 65 past an arm of a double-arm lever 66, deflecting the lever against the force of a restoring spring 67. The second arm of the lever engages in a link of a slide switch 68 of a band switch 69, not further illustrated and well known in the art, thus causing band switching in accordance with the radial position of cam 65 of any selected resistance element placed opposite the lever 66. Lever 66 may be supplied with an indicator for indication of the band selected by a selection knob. Lever 66 is journalled in a pair of bearing ears 70, secured to housing 50.

A switch contact 71 is arranged next to the operating knob 62 adjacent the operating bar 64, which connects the particular resistance element selected. The position of the operating bar 64 may be indicated by an index marking on the outer side of the operating knob 62. Holding of operating knob 62 in a desired, selected position, may be accomplished by means well known in the art and not shown in the drawings for simplicity.

For fine-tuning a station, operating knob 62 is pressed in the direction of arrow 72 until operating bar 64 engages disc 60 and causes disc 60 to deflect until the thread in disc 60 engages the rack teeth on the slider 56. If the fine tuning knob 63 is now rotated, slider 56 is moved radially, in dependence on the direction of rotation of knob 63. Upon release of operating knob 62, after fine tuning, the tuning position of the slider 56 remains, as before, again, for example, by frictional engagement of lugs 57 with insulating plate 54. Upon switching of the operating knob 62 to a different resistance element, the tuning previously made remains stored and no new engagement of slider 56 with disc 60 will be necessary.

Operating knob 62 may have index marks printed thereon to indicate a selected channel, or transmitter station. To change channels, operating knob 62 is merely turned for immediate reception of the previously tuned station.

Holding and catch elements, such as spring loaded balls engaging depressions in a circular plate, or in a drum surrounding the housing, may be used in order to insure positive placement of the operating bar opposite a resistance element; likewise, guide and catch elements, not shown in the drawings and well known in the art, may be used in order to insure that the slider 56 of any one potentiometer will be positively coupled, and that a previously selected position will not be accidentally disturbed. Index and signaling flags may be connected to sliders 56 in order to indicate the position of the sliders on the various resistance elements, for example by means of scales as shown in connection with FIG. 1, or by other mean well known in the art.

The present invention has been illustrated particularly in connection with a pushbutton selector switch for television, or similar communication receivers, as well as in connection with a rotary channel selector switch. Various modifications, within the scope of the inventive concept, may be made to adapt the structure of the present invention to particularly desired uses.

What is claimed is:

1. Selector device having a potentiometer adapted to be connected to a selector circuit including an electrical source to supply a voltage which is individually adjustable by said potentiometer, said selector comprising an elongated resistance element;

a slider having a pair of opposed faces mounted to bear against said resistance element with one face and established electrical contact with said resistance element, the opposite face thereof being formed with rack teeth;

a connection shaft having a disc mounted thereon, said disc being formed with a spiral thread on one face thereof, said slider and disc being mounted for relative movement between engaged and disengaged positions between said spiral thread and said rack teeth, whereby the position of the slider on the elongated resistance element may be varied by turning said shaft and hence said disc upon engagement of said disc with said slider;

and means connecting said resistance element and said slider.

2. Selector according to claim 1 wherein said connecting means includes a contact strip located adjacent said resistance element, said slider being in electrical connection with said contact strip and said resistance element;

and means interconnecting said contact strip and said connection means.

3. Selector according to claim 2 formed as a pushbutton selector tuner (FIGS. 1 and 2), wherein said connection shaft has a free end and is axially movable, as well as rotatable, said interconnecting means being engaged by axial displacement of said connection shaft;

and a swingable key mounted on said selector covering said free end and transferring pressure thereto for engagement of said interconnecting means while permitting swinging away from said free end to expose said free end for turning adjustment of said resistance element.

4. Selector according to claim 1 wherein said slider comprises an elongated body of insulating material in electrical contact with said resistance element, said elongated body being formed with an elongated opening therethrough, through which said connection shaft extends, said body being formed with said rack teeth on one side thereof and said elongated opening, in cooperation with said shaft, limiting the extent of travel of said body over said resistance element.

5. Selector according to claim 1 formed as a push-button selector tuner and comprising a housing, an insulating plate having said resistance element applied thereto and mounted in said housing at an angle with respect to the plane of said disc so that engagement of only part of said disc with said rack teeth can be effected.

6. Selector according to claim 1 formed as a multi-station pre-tuned pushbutton selector comprising a housing; a plurality of resistance elements and sliders selectively supplying a plurality of individually adjustable voltages; and a plurality of connection shafts and discs, one each for each resistance element mounted in said housing, said connection shafts each having a free end protruding from said housing for manual operation thereof;

an extension secured to said connection shafts and mounted at the end opposite said free end;

and means engageable by said extensions to hold an extension, and hence its associated shaft, when depressed, in said depressed condition.

7. Selector according to claim 1 formed as a multi-station pre-tuned pushbutton selector comprising a housing; a plurality of resistance elements and sliders to selectively supply a plurality of individually adjustable voltages, and a plurality of connection shafts and discs, one for each resistance element, mounted in said housing;

indicator means carried by each said slider;

and windows formed in said housing for each of said indicator means and scales associated therewith adjacent said windows cooperating with said indicator means so that the tuning position of a slider can be pre-set.

8. Selector according to claim 1 formed as a multi-station pre-tuned pushbutton selector comprising a housing; a plurality of resistance elements and sliders selectively supplying a plurality of individually adjustable voltages; and a plurality of connection shafts and discs, one each for each resistance element mounted in said housing, said connection shafts each having a free end protruding from said housing for manual operation thereof;

an extension secured to said connection shafts and mounted at the end opposite side free end;

a plurality of cams formed circumferentially on said extensions;

a switching bar swingably mounted in said housing and engageable by a selected one of said cams, in accordance with the rotary position of said extensions with respect to said switching bar;

and band switch means operated by said switching bar in accordance with the position thereof as determined by the cam engaging said switching bar.

9. Selector as claimed in claim 1 formed as a multistation rotary-selector (FIG. 3) and comprising a housing;

a plurality of resistance elements and sliders to selectively supply a plurality of individual adjustable voltages, each of said sliders establishing electrical contact with an associated resistance element and being releasably engageable with the spiral thread of said disk, a circular plate of insulating material located in said housing, said resistance elements being supported on said circular plate and radiating from the center thereof in star form;

said connection shaft having a central bore;

and a support shaft secured to said housing inserted in said central bore and passing through the center of said plate.

10. Selector as claimed in claim 9, wherein said disc is of flexible material and mounted above all said sliders; and operating means are provided engageable with said disc and operative to press the spirally threaded face of said disc against the rack teeth of a selected slider in line with said operating means.

11. Selector as claimed in claim 9, including a manually accessible fine tuning knob engaged with said connection shaft to effect fine tuning of a selected resistance means.

12. Selector as claimed in claim 10, including a manually accessible knob mounted on said operating means and rotatable about said connection shaft;

and switch means connecting a selected resistance means in said circuit in accordance with the rotary position of said knob.

13. Selector as claimed in claim 12, including a plurality of switching cams secured to the circumference of said manually accessible knob, one each corresponding to the location of a resistance element;

a band switch means;

and a spring-loaded means engageable by said cams and connected to operate said band switch means.

References Cited

UNITED STATES PATENTS

| | | | |
|---|---|---|---|
| 2,273,760 | 2/1942 | Nelson | 338—183 X |
| 3,307,133 | 2/1967 | Wolff | 338—183 X |
| 3,371,305 | 2/1968 | De Long | 338—183 X |

LEWIS H. MYERS, Primary Examiner

G. P. TOLIN, Assistant Examiner

U.S. Cl. X.R.

338—128, 196, 198